United States Patent Office 3,114,297
Patented Dec. 17, 1963

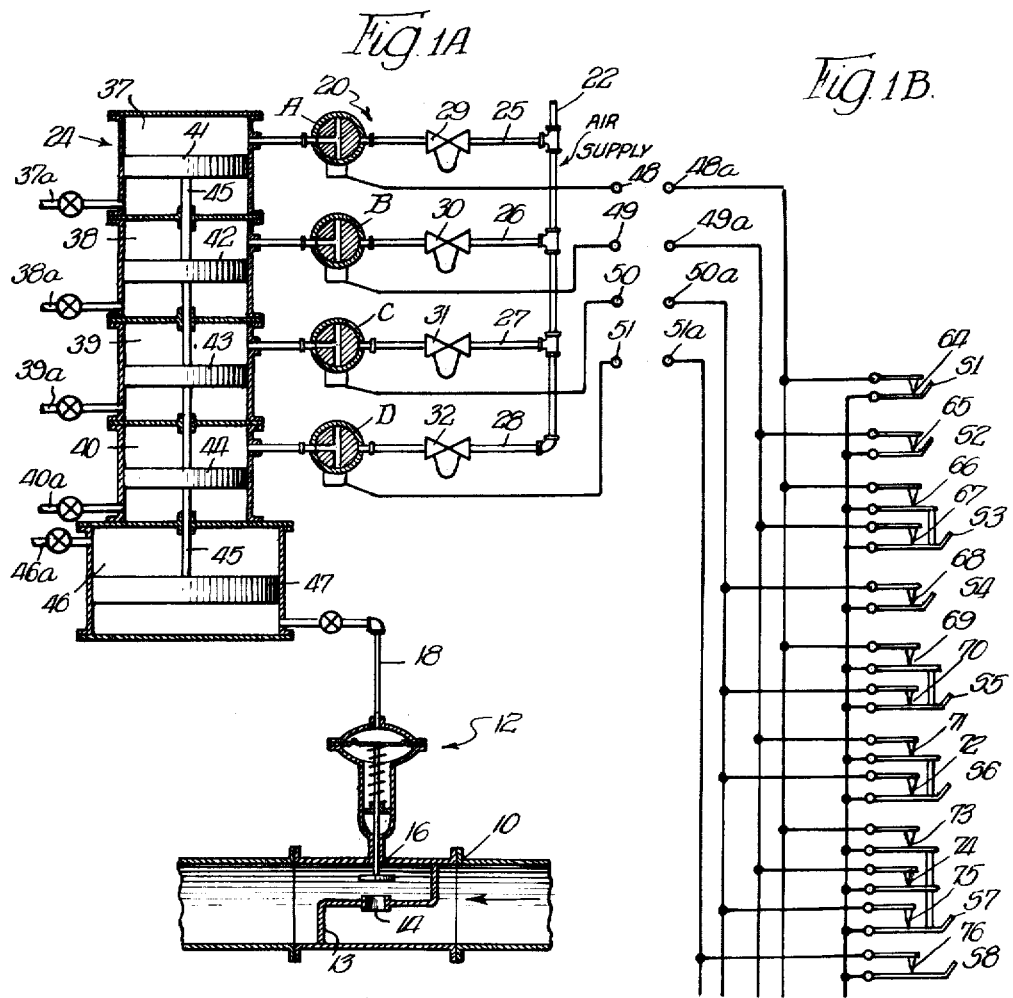

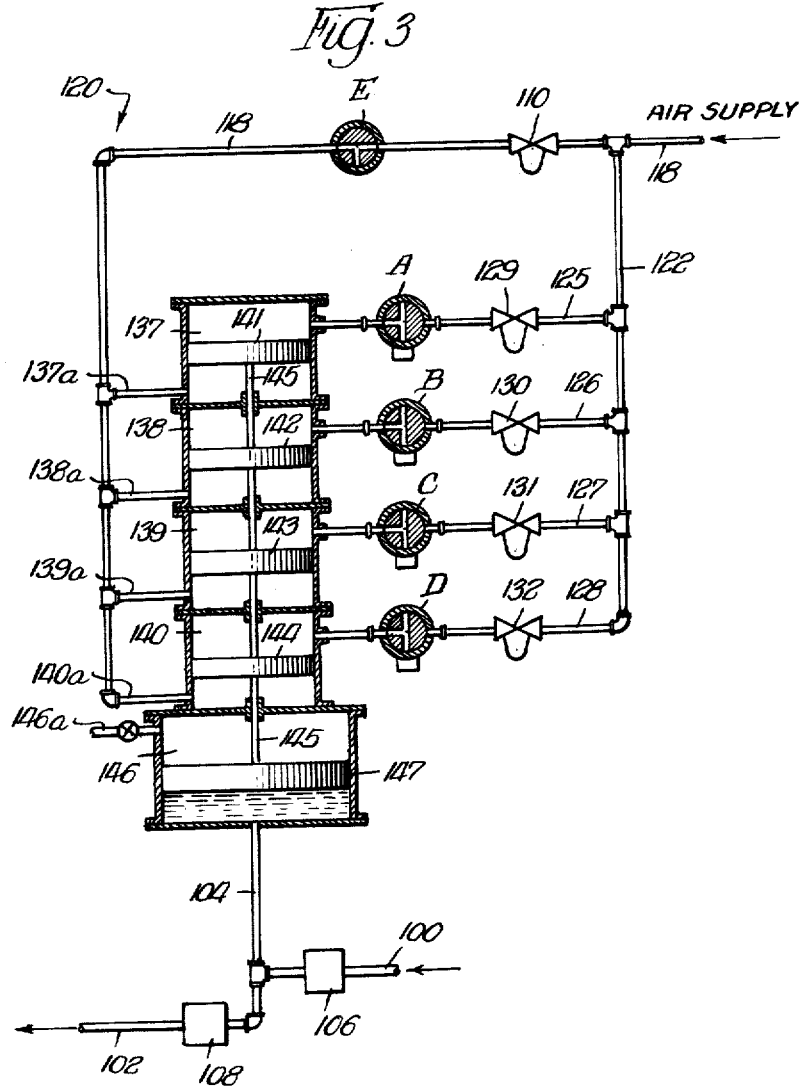

3,114,297
PILOT DIGITAL POSITIONER
Terrence Gizeski, 11357 S. Normal St., Chicago, Ill.
Filed Jan. 24, 1962, Ser. No. 168,387
16 Claims. (Cl. 91—414)

The present invention relates to digital control systems for dynamical operators. By the term "digital control systems" is meant a control arrangement which provides for a plurality of control points differing, progressively, from one another by uniform discrete increments. By the term "dynamical operator" is meant any device, installation or apparatus that is operated by means of a physical force or energy. Specifically the invention relates to a pressure regulator system for controlling pressure and to a system for pumping fluid.

An object of the invention is to provide in a control system, a digital regulator supplier made up of a nominal number of similar binary control units in which each unit is adjusted to perform a regulating function corresponding to an integer portion in a binary progression and wherein digital regulating operation is performed by the regulator supplier in conjunction with a cumulator and by means of individual and collective operation of the binary control units.

A specific object of the invention is to provide a pumping system which may be controlled directly from digital signals and in a binary progression pattern in a manner so as to achieve digital control with a minimum amount of required equipment.

Further objects and features of the invention pertain to the particular structure and arrangements whereby the above objects are achieved. The invention, both as to its principles and mode of use, will be better understood by reference to the following specification and drawings forming a part thereof wherein:

FIGURE 1A is a schematic diagram of a digital regulator control valve assembly in accordance with the present invention;

FIGURE 1B is a schematic diagram of a manual control circuit for operating the valve assembly of FIGURE 1A;

FIGURE 2 is a chart showing the manner in which the digital regulator control valve assembly of FIGURE 1A is operated to effect digital control; and FIGURE 3 is a schematic diagram of digital pumping assembly in accordance with the present invention.

Regulation in any type of control system is actually the controlled selection of a fraction of the total range or spectrum of performance by the system. Performance might be measured, for example, as a function of the total area, distance, force, pressure, speed, flow, torque, work or power, to cite some of the various ways by which dynamical units can be measured. To give a specific example, in a fluid flow system comprising a pipe with a pressure controlled valve suitable to vary the total cross-sectional or port area of the valve or the position of the valve member with respect to the valve seat, the ultimate control is provided by pressure regulators. The pressure regulators determine the pressure applied to the pressure controlled valve which in turn determines the total port area or position of the valve member with respect to the valve seat and thereby controls the flow of fluid through the pipe.

In order to provide digital regulation, the pressure regulators have to be arranged to be opened progressively and in definite steps so that each step in the progression will be the same. This is in fact digital control. To provide digital control of any consequence for purposes of obtaining accuracy, it is necessary to provide a multiplicity of control points which, in the ordinary circumstance, means a corresponding number of things controlled and, in the present example, a corresponding number of pressure regulators. However, it has been found that a nominal number of control units, such as pressure regulators, can be employed to provide a multiplicity of control points if each pressure regulator is proportioned to conform to an integer of a binary progression. For example, in a four-unit pressure regulator system such as shown in FIGURE 1A the total pressure $P_t$ would be equal to the sum of the individual pressure as follows:

$$P_t = P_1 + P_2 + P_3 + P_4$$

wherein the pressure through any one of the individual pressure regulators $P_x$ is:

$$P_x = \frac{2^{x-1}}{2^n - 1} P_t$$

$n$=number of units in assembly

In an arrangement having such proportionate relationships $2^n$ linear regulating control points are available by operating the units in proper combinations and in proper sequence. Thus in a four-unit system, sixteen linear regulating control points can be achieved, including the position where all the pressure regulators are closed. In a system where greater accuracy or where a greater number of linear regulating control points is required, an increased unit system may be employed such as a 10-unit system which will yield 1024 control points. A better understanding of this mathematical presentation will be had from a consideration of the arrangement shown in the drawing.

Referring now to the drawings, and more particularly to FIG. 1A, there is illustrated a digital regulator control valve assembly, indicated generally by reference numeral 20, which, through a pressure regulated valve 12, controls the fuel being delivered through a supply line 10 to a furnace not shown. The pressure regulated valve 12 comprises a valve seat 13 and a pressure actuated, movable valve member 16. An orifice 14 through the valve seat 13 permits the fuel to flow through the valve 12 to the furnace when the valve member 16 is not blocking off the orifice 14. The position of the valve member 16 with respect to the orifice 14, of course, determines the amount of fuel which will flow through the valve 12 to the furnace.

The digital regulator control assembly 20 is connected to the pressure regulated valve 12 by a pressure line 18, the pressure of the gas in line 18 determining the position of the valve member 18 with respect to the orifice 14 which is determinative of the amount of fuel flowing through the line 10 to the furnace. It will be understood that any type of pressure regulated control valve may be employed and that valve 12 is merely exemplary of one such type of pressure regulated control valve.

The digital regulator control valve assembly 20 has a constant pressure air supply through line 22 which is connected to a piston and cylinder assembly, indicated generally by reference numeral 24, by conduits 25, 26, 27 and 28, each of which have a pressure regulator 29, 30, 31 and 32, respectively, and a solenoid valve A, B, C and D, respectively. The piston and cylinder assembly 24 comprises individual piston chambers 37, 38, 39 and 40 having in fluid tight relationship therein pistons 41, 42, 43 and 44, respectively, which have equal cross-sectional areas and are connected in series with one another by a piston shaft 45. In addition, the piston and cylinder assembly 24 contains a pressure control chamber 46 with a piston 47 in fluid tight relationship therein. The piston 47 is also connected to the piston shaft 45. The upper part of each piston chamber 37, 38, 39 and 40 communicates with conduits 25, 26, 27 and 28, respectively, while the lower portion of these piston chambers communicates with the atmosphere through valved conduits 37a, 38a, 39a and 40a. By contrast the upper portion of the pressure control chamber 46 communicates with the atmosphere through a valved passageway 46a while the lower portion of the chamber communicates with the line 18 and the pressure regulated control valve 12.

The pressure regulators 29, 30, 31 and 32 are set at a pressure proportioned to the total pressure requisite to close the pressure regulated valve 12 in accordance with a binary progression. Therefore, assuming that the total pressure, p.s.i.g., required to close the pressure regulated control valve 12 is $P_t$, then the pressure regulator 29 will be set for $1/15$ of the pressure $P_t$, the pressure regulator 30 will be set for $2/15$ of the pressure $P_t$, the pressure regulator 31 will be set for $4/15$ of the pressure $P_t$, and the pressure regulator 32 will be set for $8/15$ of the pressure $P_t$. The air pressure in the line 22 will, of course, be equal to or greater than the pressure $P_t$. The solenoid operated valves A, B, C and D operate from electrical contacts 48, 49, 50 and 51, respectively.

In this manner, if valve A is opened the pressure in chamber 37 will be $1/15\ P_t$ causing the piston 41 to move and transmit this force through the piston shaft 45 to the piston 47 in chamber 46. This will create a pressure in the lower portion of the chamber 46 communicating with the line 18 and the pressure regulated control valve 12. Likewise, if both solenoid valves A and B are opened the chamber 37 will again be at $1/15\ P_t$ and the chamber 38 will be at $2/15\ P_t$. The pistons 41 and 42 act in series and will therefore transmit through the piston shaft 45 sufficient force to create a three times larger pressure in the lower portion of the chamber 46 communicating with the line 18 and the pressure regulated control valve 12. When the valves A, B, C and D are closed, they vent the upper portion of the piston chambers 37, 38, 39 and 40, respectively, to the atmosphere.

Control of the solenoid valves A, B, C and D to achieve linear regulation and thereby the control of the flow of fluid through the pipe 10 can be achieved through the switch arrangement shown in FIGURE 1B which is connected in accordance with the pattern shown in FIGURE 2. Specifically, assuming that the terminals 48a, 49a, 50a and 51a in FIGURE 1B are connected respectively to the terminals 48, 49, 50 and 51 of FIGURE 1A, the digital pressure regulator system would be operated into the first position upon closure of the contacts 64 of switch S1 which would apply ground potential to the terminal 48a and cause the solenoid valve A to be opened. To operate the control valve assembly 20 into the second digital position, the contacts 65 of switch S2 would be closed thereby to apply ground potential to the terminal 49a and cause solely the solenoid valve B to be opened. To operate the digital control valve assembly 20 into the third digital position, the contacts 66 and 67 of switch S3 will be closed thereby to apply ground potential to the terminals 48a and 49a thereby to cause solenoid valves A and B to operate jointly. The procedure is continued according to the pattern set forth in FIGURE 2 and as diagrammatically described in part in FIGURE 1B, whereby any one of the digital positions can be manually effected by closing the appropriate switches. Of course, the sixteenth digital position is when all the solenoid valves A, B, C and D are closed and the pressure controlled valve 12 is open to its maximum position.

It will be understood however that any informational device supplying information in terms of a binary progression may be employed to control the solenoid valves A, B, C and D. For example, a taped program may be employed in which a predetermined sequence of operation of the pressure regulated control valve is effected by controlling the opening and closing of the solenoid valves A, B, C and D.

FIGURE 3 illustrates a pumping system, indicated generally by reference numeral 120, embodying the principles of the present invention. The liquid to be pumped is received from a suitable source, such as a supply tank or the like not shown, by line 100 and pumped by the pumping system 120 through line 102 to a predetermined destination. The line 100 has a one-way check valve 105 therein which allows liquid to flow through the line 100 only in the direction indicated by the arrow in FIGURE 3. Likewise, the line 102 has a one-way check valve 108 which only allows liquid to flow through the line 102 in the same direction, as indicated by the arrow in FIGURE 3. The purpose of valves 106 and 108 will be more apparent hereinafter.

The pumping system 120 comprises individual piston chambers 137, 138, 139 and 140 having in fluid tight relationship therein pistons 141, 142, 143 and 144, respectively, which have equal cross-sectional areas and are connected in series with one another by a piston shaft 145. In addition, the pumping system 120 has a pumping chamber 146. The lower portion of the pumping chamber 146 communicates via a line 104 the inlet line 100 and the outlet line 102. The upper portion of the pumping chamber 146 communicates with the atmosphere through a valved conduit 146a. A piston 147 is in fluid tight relationship within the pumping chamber 146 and is connected to the piston shaft 145.

The liquid is drawn from the line 100 into the pumping chamber 146 by the upward movement of the piston 147 and pumped through the line 102 when the piston 147 is forced downwardly in the pumping chamber 146. The manner in which the piston 147 is reciprocated will be more apparent hereinafter.

To these ends the pumping system 120 includes a constant air pressure supply through line 118 which has a pressure regulator 110 and a solenoid valve E. The air supply line 118 communicates with the lower portion of the chamber 137, 138, 139 and 140 through lines 137a, 138a, 139a and 140a, respectively. The communication of the air supply line 118 to the lower portion of the chambers 137, 138, 139 and 140 is to effect upward movement or retraction of the piston 147 after it has completed its pumping or downward stroke. On the other hand, the air supply line 118, through the by-pass line 122, communicates with the upper portion of the chambers 137, 138, 139 and 140 through conduits 125, 126, 127 and 128, respectively, each of which have a pressure regulator 129, 130, 131 and 132, respectively, and a solenoid valve A, B, C and D, respectively. The communication of the air supply line 118 with the upper portion of the piston chambers 137, 138, 139 and 140 in this manner is to effect the pumping or downward stroke of the piston 147.

Whenever air under pressure from the line 118 is entering the lower portion of the piston chambers 137, 138, 139 and 140 via the lines 137a, 138a, 139a and 140a, respectively, the valves A, B, C and D are set to prevent air from the line 118 entering the upper portion of these piston chambers, but to allow air exhausted from these piston chambers to pass to the atmosphere. Likewise, when the air under pressure from the line 118 is entering the upper portions of any of these piston chambers through lines 125, 126, 127 and 128 and the valves A, B, C and D, respectively, then the valve E is set in a position to prevent air from the line 118 entering the lower portions of these piston chambers, but to allow air to be exhausted from the lower portion of these chambers to the atmosphere.

The pressure regulators 129, 130, 131 and 132 are set at a pressure proportioned to the greatest pumping action desired to be affected by the pumping system 120 in accordance with a binary progression. Therefore, assuming that the maximum desired pressure, psig., to be affected by the piston 147 requires $P_t$ on the pistons 141, 142, 143 and 144, then the pressure regulator 129 will be set for $1/15$ of the pressure $P_t$, the pressure regulator 130 will be set for $2/15$ of the pressure $P_t$, the pressure regulator 131 will be set for $4/15$ of the pressure $P_t$, and the pressure regulator 132 will be set for $8/15$ of the pressure $P_t$. The air pressure in the line 118 will, of course, be equal to or greater than the pressure $P_t$.

The pumping system 120 operates in the following manner. The valve E is opened as shown in FIGURE 3, whereby air under pressure enters the piston chambers 137, 138, 139 and 140 via conduits 137a, 138a, 139a and 140a, respectively. This causes the pistons 141, 142, 143 and 144 to be forced upwardly in their respective piston chambers thereby moving the pumping piston 147 upwardly in the pumping chamber 146. The upward movement of the pumping piston 147 draws liquid through line 100 and valve 106 into the line 104 and the piston chamber 146 as shown in FIGURE 3. It will be noted that during the liquid intake step the valves A, B, C and D will not let air from line 118 enter the upper portion of the piston chambers, but will let air being exhausted from these piston chambers pass to the atmosphere. The liquid intake step terminates when the solenoid valve E is actuated to close off the supply of air under pressure from line 118 to the piston chambers and allow air from the lower portion of the piston chambers to be exhausted to the atmosphere. At the same time one or more of the valves A, B, C and D, depending upon the pumping pressure desired, are opened to allow air under pressure to enter the upper portion of one or more of piston chambers 137, 138, 139 and 140. For example, if it is desired to pump the liquid with $\frac{1}{15}$ $P_t$ the solenoid valve A is actuated to allow air to enter the upper portion of the piston chamber 137 via the conduit 125 . This creates on the piston 141 a pressure of $\frac{1}{15}$ $P_t$ which is transferred through the piston shaft 145 to the pumping piston 147 acting on the liquid in the lower portion of the pumping chamber 147 to pump it by a downward stroke through the line 104 and line 102 to the predetermined destination.

It will be understood that during the pumping stroke of the pumping piston 147 that the valve 106 prevents the fluid from being forced through line 100, and that during the intake stroke of the pumping piston 147 the one-way valve 108 prevents liquid from being drawn through the line 102 into the pumping chamber 146.

Likewise, if it is desired to pump the liquid under the influence of $\frac{3}{15}$ $P_t$, the valves A and B are opened whereby the $\frac{1}{15}$ $P_t$ in chamber 137 and $\frac{2}{15}$ $P_t$ in the piston chamber 138, act cumulatively upon the pistons 141 and 142 to cause the pumping piston 147 to act upon the liquid in the pumping chamber 146.

The actuation of the solenoid valves A, B, C and D to achieve linear regulation and thereby control the pumping action through the line 102 can be achieved through substantially the same switch arrangement shown in FIGURE 1B and discussed hereinbefore. This switching is connected in accordance with the pattern shown in FIGURE 2. Specifically the only difference between the switch arrangement shown in FIGURE 1B and that necessary to control the pumping system illustrated in FIGURE 3, is that the pumping system 120 will require a timer to assure that when any one of the valves A, B, C and D are in the open position, i.e., allowing air under pressure to enter the piston chambers and effect the pumping stroke, that the solenoid valve E is in its exhaust position. Likewise when the valve E, is in its open position, i.e., allowing air under pressure to enter the lower portions of the piston chambers and effect the intake stroke, the valves A, B, C and D must be in their exhaust positions. Furthermore, the timer will control the length of time in which the pumping piston 147 is effecting its downward or pumping stroke, and the length of time in which the pumping piston 147 is effecting its upward or intake stroke.

It will be furthermore understood that under the described operation of the pumping system 120 that the liquid will be pumped under a pulsating-type feed. It will be understood that this pulsating feed may be converted after the valve 108 to a steady pressure flow by means well known in the art.

It will be understood, that the control of the pumping system 120 may be done by a computer or punched tape programmer such as described hereinbefore with respect to the pressure regulator system.

Furthermore, it will be understood that a liquid rather than a gas may be employed to effectuate the control systems described hereinabove.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A pressure control system comprising a plurality of first piston chambers each having a first piston therein, said first pistons having substantially the same cross-sectional area, a pressure control chamber having a second piston therein, said second piston and said first pistons being connected in series, means to supply fluid under pressure to each of said piston chambers, each piston chamber having a selectively controllable pressure regulator to control the pressure of the fluid entering said piston chamber, said pressure regulators as compared to another being set to conform to a binary progression.

2. A pressure control system for a pressure controlled valve comprising a plurality of first piston chambers each having a first piston therein, said first pistons having substantially the same cross-sectional area, a pressure control chamber with a second piston therein, said first pistons and said second pistons being connected in series, said pressure control chamber being adapted to communicate with said pressure controlled valve, means to supply fluid under pressure to each of said piston chambers on the same side of said first pistons therein whereby pressure is created in said pressure control chamber, each piston chamber having a selectively, controllable pressure regulator to control the pressure of the gas entering said piston chamber, said pressure regulators as compared to another being set to conform to a binary progression.

3. A pressure control system for a pressure controlled valve comprising a plurality of first piston chambers each having a first piston of substantially the same cross-sectional area therein, a pressure control chamber having a second piston therein, said pressure control chamber being adapted to communicate with said pressure controlled valve, said first pistons and said second piston being connected in series, means to supply gas under pressure to each of said piston chambers on the same side of said first pistons therein to move said second piston and create a pressure within said pressure control chamber, each piston chamber having a pressure regulator to control the pressure of the gas entering said piston chamber and having valve means to terminate the flow of said gas to any and all of said piston chambers, said pressure regulators being set for $$P_x = \frac{2^{x-1}}{2^n - 1} Pt$$

where $n$ equals the number of said pressure regulators, $P_t$ equals the maximum pressure to be exerted upon said second piston by said other pistons, and $x$ equals the number of an individual pressure regulator in the system.

4. The pressure control system of claim 3 wherein said valve means are automatically controlled.

5. Apparatus for driving a pump comprising a plurality of first piston chambers each having a first piston therein, said first pistons having substantially the same cross-sectional area, said first pistons being connected in series and being adapted to be connected to said pump, means to supply fluid under pressure to each of said piston chambers on the same side of said first pistons therein each piston chamber having a selectively, controllable pressure regulator to control the pressure of fluid entering said piston chambers, said pressure regulators being set as compared to one another to conform to a binary progression.

6. The apparatus of claim 5 wherein said pressure regulators are actuated by a device supplying information in terms of a binary progression.

7. Apparatus for driving a pump comprising a plurality of first piston chambers each having therein a first piston of substantially the same cross-sectional area, said first pistons being adapted to be connected to said pump to control intake and pumping strokes of said pumps, said first pistons being connected in series, means to supply gas under pressure to each of said piston chambers, said means to supply gas including first means communicating with one end of each of said piston chambers to supply gas to said piston chambers for said intake stroke of said pump and second means to supply gas to the other end of said piston chambers whereby said first pistons therein act cumulatively to effect the pumping stroke of said pump, said first means including a valve to terminate the flow of gas to said piston chambers during said intake stroke, said second means including a pressure regulator for each piston chamber to control the pressure of the gas being supplied to said piston chambers during said pumping stroke and valves for each piston chamber to terminate the flow of gas to each of said piston chambers individually, said pressure regulators being set as compared to one another to conform to a binary progression.

8. The apparatus of claim 7 wherein said valve in said first means and said valves in said second means are automatically operated.

9. The apparatus of claim 7 wherein said valves in said second means are automatically operated by a means which supplies information in terms of a binary progression.

10. The apparatus of claim 7 wherein said pressure regulators in said second means are set for $$P_x = \frac{2^{x-1}}{2^n - 1} P_t$$

where $n$ equals the number of said pressure regulators, $P_t$ equals the maximum pressure to be exerted upon said pump by said other pistons during the pumping stroke, and $x$ equals the number of an individual pressure regulator in the apparatus.

11. The apparatus of claim 7 wherein said valve in said first means allows gas to be exhausted from said piston chambers when said valves in said second means allow gas to enter said piston chambers during said pumping stroke of said pump.

12. The apparatus of claim 11 wherein said valves in said means allow gas from said piston chambers to be exhausted to the atmosphere when air is being supplied to said piston chambers by said first means during said intake stroke of said pump.

13. The pressure control system of claim 1 wherein there are $n$ number of first piston chambers whereby said pressure control chamber may provide $2^n$ pressure control points.

14. The pressure control system of claim 2 wherein there are $n$ number of first piston chambers whereby said pressure control chamber may provide $2^n$ pressure control points.

15. The pressure control system of claim 2 wherein said pressure regulators are actuated by a device supplying information in terms of a binary progression.

16. The apparatus of claim 5 wherein there are $n$ number of first piston chambers whereby said first pistons provide $2^n$ control points for said pump.

References Cited in the file of this patent

UNITED STATES PATENTS

| | | |
|---|---|---|
| 1,495,274 | Teetor | May 27, 1924 |
| 1,561,341 | Martin | Nov. 10, 1925 |
| 2,080,695 | Cargile | May 18, 1937 |
| 2,335,824 | Dillman | Nov. 30, 1943 |
| 2,443,345 | Ernst | June 15, 1948 |
| 2,916,205 | Litz | Dec. 8, 1959 |
| 2,999,482 | Bower | Sept. 12, 1961 |

UNITED STATES PATENT OFFICE
CERTIFICATE OF CORRECTION

Patent No. 3,114,297            December 17, 1963

Terrence Gizeski

It is hereby certified that error appears in the above numbered patent requiring correction and that the said Letters Patent should read as corrected below.

Column 4, line 18, after "104" insert -- with --; line 34, for "chamber" read -- chambers --; line 46, for "o fthe" read -- of the --; line 58, after "any" insert -- one --; column 7, line 10, for "pumps" read -- pump --.

Signed and sealed this 30th day of June 1964.

(SEAL)
Attest:

ERNEST W. SWIDER            EDWARD J. BRENNER
Attesting Officer            Commissioner of Patents